United States Patent
Feng

(10) Patent No.: US 12,206,985 B2
(45) Date of Patent: Jan. 21, 2025

(54) PICTURE SHOOTING METHOD AND APPARATUS AND ELECTRONIC DEVICE

(71) Applicant: VIVO MOBILE COMMUNICATION CO., LTD., Guangdong (CN)

(72) Inventor: Wei Feng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 101 days.

(21) Appl. No.: 18/164,717

(22) Filed: Feb. 6, 2023

(65) Prior Publication Data

US 2023/0188842 A1 Jun. 15, 2023

Related U.S. Application Data

(63) Continuation of application No. PCT/CN2021/110652, filed on Aug. 4, 2021.

(30) Foreign Application Priority Data

Aug. 7, 2020 (CN) .......................... 202010791067.7

(51) Int. Cl.
*H04N 23/667* (2023.01)
*H04N 23/63* (2023.01)

(52) U.S. Cl.
CPC ......... *H04N 23/667* (2023.01); *H04N 23/632* (2023.01)

(58) Field of Classification Search
CPC .... H04N 23/667; H04N 23/632; H04N 23/60; H04N 23/951; H04N 23/62; H04M 1/72469; H04M 1/0264; H04M 1/0266; H04M 2250/52
See application file for complete search history.

(56) References Cited

U.S. PATENT DOCUMENTS

| | | |
|---|---|---|
| 2010/0165808 A1 | 7/2010 | Harada et al. |
| 2011/0242348 A1 | 10/2011 | Yana |
| 2017/0255314 A1* | 9/2017 | Choi ........................ G06F 3/015 |
| 2020/0210061 A1 | 7/2020 | Pei et al. |
| 2021/0360168 A1 | 11/2021 | Zhao |
| 2022/0229708 A1 | 7/2022 | Hu |

(Continued)

FOREIGN PATENT DOCUMENTS

| | | |
|---|---|---|
| CN | 102209192 A | 10/2011 |
| CN | 102419689 A | 4/2012 |
| CN | 105100494 A | 11/2015 |

(Continued)

OTHER PUBLICATIONS

Peipei Li, Inventory of mobile phone black technology in 2019, the commanding height at this moment, the starting point at the next moment, Advertisement 2019, China.

*Primary Examiner* — Kelly L Jerabek
(74) *Attorney, Agent, or Firm* — Price Heneveld LLP

(57) ABSTRACT

A picture shooting method and an electronic device are disclosed. The method includes: starting an under-display camera when a first picture is moved to a first region, where the first region is a screen region corresponding to a position of the under-display camera. In embodiments of this application, a user can start the under-display camera by performing a simple operation of moving a picture, which is flexible and convenient.

12 Claims, 7 Drawing Sheets

(56) References Cited

U.S. PATENT DOCUMENTS

2022/0329741 A1\* 10/2022 Qu ........................ G06F 3/0488
2023/0103098 A1\* 3/2023 Nakata ................. H04N 5/2628
                                                                348/36

FOREIGN PATENT DOCUMENTS

| CN | 106407789 A | 2/2017 |
|---|---|---|
| CN | 108833709 A | 11/2018 |
| CN | 109684110 A | 4/2019 |
| CN | 109862267 A | 6/2019 |
| CN | 110333814 A | 10/2019 |
| CN | 110572575 A | 12/2019 |
| CN | 110647277 A | 1/2020 |
| CN | 110995990 A | 4/2020 |
| CN | 111031253 A | 4/2020 |
| CN | 111083377 A | 4/2020 |
| CN | 111953900 A | 11/2020 |

\* cited by examiner

PICTURE SHOOTING METHOD AND APPARATUS AND ELECTRONIC DEVICE

CROSS-REFERENCE TO RELATED APPLICATIONS

This application is continuation application of PCT International Application No. PCT/CN2021/110652 filed on Aug. 4, 2021, which claims priority to Chinese Patent Application No. 202010791067.7, filed in China on Aug. 7, 2020, both of which are incorporated herein by reference in their entireties.

TECHNICAL FIELD

This application belongs to the field of mobile terminal technologies, and specifically, relates to a picture shooting method and apparatus and an electronic device.

BACKGROUND

An under-display camera is a camera disposed under a display panel of an electronic device and started when needed for shooting. With the under-display camera technology, the display panel is free from a punch hole or waterdrop notch, implementing a true full screen.

Currently, when needing to start the under-display camera, a user needs to switch to the home screen to find a camera icon of the under-display camera, and then tap the camera icon to start the camera for shooting. This process of starting the under-display camera for shooting requires that the user perform quite many operations, which are rigid and cumbersome. Especially in a case of an electronic device having a plurality of home screens and a large quantity of application icons, the user usually needs to spend long time in finding the icon of the under-display camera, causing inconvenience to the user.

SUMMARY

To resolve the foregoing technical problem, this application is implemented as follows.

According to a first aspect, an embodiment of this application provides a picture shooting method, where the method includes:
  starting an under-display camera when a first picture is moved to a first region, where the first region is a screen region corresponding to a position of the under-display camera.

According to a second aspect, an embodiment of this application provides a picture shooting apparatus, where the apparatus includes:
  a starting module, configured to start an under-display camera when a first picture is moved to a first region, where the first region is a screen region corresponding to a position of the under-display camera.

According to a third aspect, an embodiment of this application provides an electronic device, where the electronic device includes a processor, a memory, and a program or instructions stored in the memory and capable of running on the processor, and when the program or instructions are executed by the processor, the step of the method according to the first aspect is implemented.

According to a fourth aspect, an embodiment of this application provides a readable storage medium, where the readable storage medium stores a program or instructions, and when the program or instructions are executed by a processor, the step of the method according to the first aspect is implemented.

According to a fifth aspect, an embodiment of this application provides a chip, where the chip includes a processor and a communications interface, the communications interface is coupled to the processor, and the processor is configured to run a program or instructions to implement the method according to the first aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances so that the embodiments of this application described herein can be implemented in other orders than the order illustrated or described herein. In addition, in the specification and claims, "and/or" represents at least one of connected objects, and the symbol "/" generally represents an "or" relationship between associated objects.

The following specifically describes the picture shooting method provided in the embodiments of this application through specific embodiments and application scenarios thereof with reference to the accompanying drawings.

Figure 1:
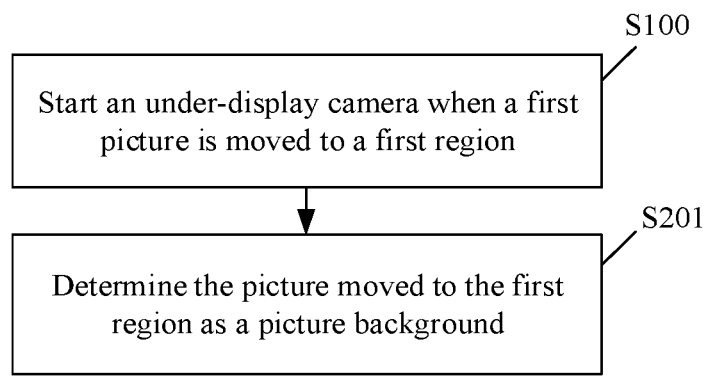
FIG. 1 is a flowchart of steps of a picture shooting method according to an embodiment of this application.

Refer to FIG. 1 which is a flowchart of steps of a picture shooting method according to an embodiment of this application. The method may include S100.

In actual application, the method may be applied to an electronic device. The electronic device may be a terminal device equipped with an under-display camera, such as a mobile phone or a tablet computer.

S100. Start an under-display camera when a first picture is moved to a first region, where the first region is a screen region corresponding to a position of the under-display camera.

In S100, when it is detected that one or more pictures are moved to the screen region corresponding to the position of the under-display camera, the under-display camera is started to trigger a shooting function for picture shooting. When a shooting instruction is received, a corresponding target picture is generated to finish a picture shooting process. In the foregoing control manner, provided that at least one picture is moved to inside a prompt box, the under-display camera can be triggered to start. The operation is simple, flexible, and fast, avoiding a tedious operation of finding a camera icon among a large number of application icons and shortening a time to start the under-display camera for a user, thereby facilitating starting the under-display camera quickly to capture fleeting scenes.

Optionally, in an implementation, before S100, the picture shooting method provided in this embodiment of this application further includes S1001.

S1001. Display an under-display camera prompt box in the first region on a preset screen.

In S1001, the preset screen is a screen set in advance which can display the camera prompt box. In actual application, the preset screen is a screen at which the camera is usually used to shoot pictures or videos, for example, a lock screen, a leftmost home screen, a smart scene screen, an album screen, and a shooting screen. In actual application, the preset screen may be added or removed as required by the user.

The prompt box, displayed on a screen, is used to indicate a specific position of the under-display camera, and the display position of the prompt box on the screen corresponds to the position of the under-display camera. Specifically, the prompt box is displayed on a screen just above the under-display camera to conveniently and intuitively indicate the specific position of the under-display camera.

In this implementation, the prompt box for the under-display camera being displayed in the first region of the screen enables the user to know an accurate position of the under-display camera, which is more convenient for the user to move at least one first picture to inside the screen region corresponding to the position of the under-display camera, so as to quickly start the under-display camera for picture shooting.

Figure 2:
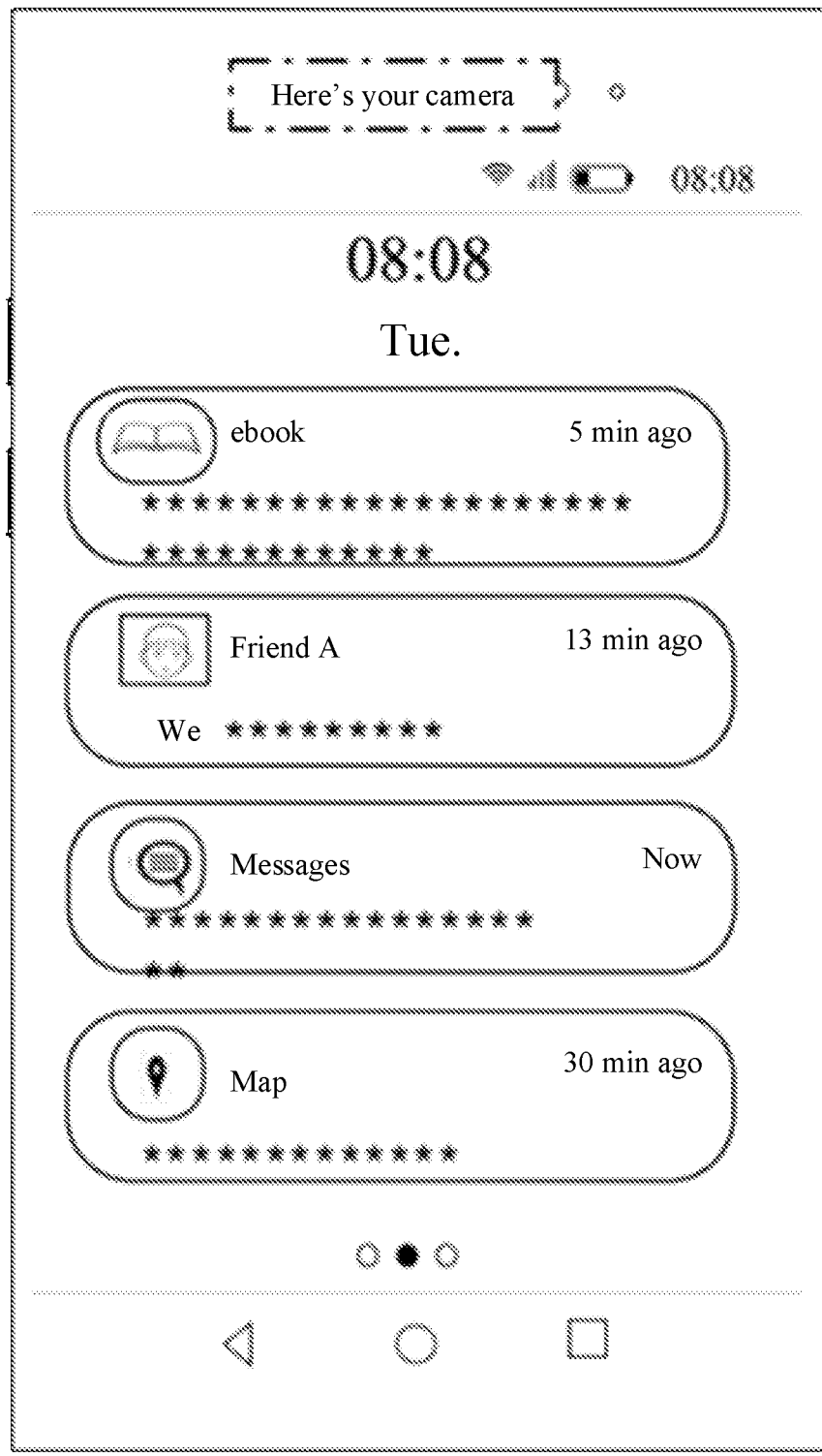
FIG. 2 is a schematic diagram of a prompt box displayed on a lock screen according to an embodiment of this application.

In actual application, the prompt box may be displayed on the screen in a form of a dashed box, displaying corresponding prompt information. For details, refer to FIG. 2 which shows a schematic diagram of a prompt box displayed on a lock screen. The prompt box is displayed in a form of a dashed line on the screen region corresponding to the position of the under-display camera, and prompts "Here's your camera".

Optionally, if the user directly taps the dashed prompt box for a preset number of times, for example, twice, the under-display camera can also be quickly waked, without using a manner of finding and tapping the camera icon to start the under-display camera.

Optionally, in a specific implementation, S1001 specifically includes: in a case that a preset control is enabled, displaying the prompt box for the under-display camera in the first region in the preset screen.

The preset control is configured to control the prompt box to be turned on or off, and the preset control may be displayed on the screen in a form of a floating ball, or may be arranged in a menu bar of the electronic device. The preset control has two states: being on and being off. When tapping on the preset control makes the preset control be in an on state, the prompt box can be controlled to be displayed on the preset screen; and when tapping on the preset control makes the preset control be in an off state, the prompt box can be controlled not to be displayed on the preset screen.

In this specific implementation, the prompt box for the under-display camera is displayed in the first region of the screen only in a case that the preset control is on and the preset screen is detected. This is convenient for the user to determine, according to actual needs, whether the prompt box for the under-display camera is displayed on the preset screen.

In an optional embodiment, when the under-display camera is turned on, the screen region corresponding to the under-display camera automatically becomes transparent, that is, the light transmittance is 100%, so that the user can directly see a camera structure hidden behind the screen, giving the user a real, high-class, and intelligent intuitive feeling.

In actual application, the at least one picture may be any picture on the preset screen, and specifically may be a picture displayed through an application such as a web page, Moments, or an album. The user just needs to select the at least one picture and move it to the prompt box to trigger the under-display camera to shoot a picture for generating a target picture.

Optionally, in an implementation, according to the picture shooting method provided in the embodiment of this application, in a case that one picture is moved to inside the prompt box, still referring to FIG. 1, after S100, S201 is further included.

S201. Determine the picture moved to the first region as a picture background.

In S201, the user choosing to move the at least one picture to inside the screen region corresponding to the position of the under-display camera indicates that the user wants to use the at least one picture as a background material to process a current picture scene acquired by the under-display camera, and in a case that one picture is moved to the first region, the picture being directly used as the shooting background allows a shooting effect of a composited picture to be displayed in real time.

In actual application, when the picture moved to the first region changes, the picture background also changes correspondingly, that is, the picture background may be updated based on the picture moved to the first region.

Optionally, in an implementation, after S201, the picture shooting method provided in this embodiment of this application further includes S202 and S203.

S202. Invoke the under-display camera to acquire a preview picture.

In S202, the preview picture is a current scene view within a field of view of the under-display camera. As the under-display camera is in the on state, the under-display camera can acquire the current scene within its field of view to obtain the preview picture.

S203. Generate a target picture based on the preview picture and the picture background.

In S203, the preview picture acquired in S202 and the background picture determined in S201 are composited, so as to generate the target picture and display the target picture on the screen.

In actual application, a plurality of picture composite manners may be displayed on the screen. When second input on a target picture composite manner by the user is received, the preview picture and the background picture are composited based on the target picture composite manner in response to the second input.

Specifically, the picture composite method may include upper overlay and lower overlay. When the second input by the user on the upper overlay is received, the preview picture is overlaid on the background picture for picture compositing, and a target picture is generated; or when the second input on the lower overlay by the user is received, the background picture is overlaid on the preview picture for picture compositing, and a target picture is generated.

In this implementation, when it is detected that one picture is moved to the screen region corresponding to the position of the under-display camera, not only the under-display camera can be started for picture shooting, but also the picture moved to inside the prompt box, serving as the picture background, is composited into the target picture together with the preview picture acquired by the under-display camera. In this way, the user just needs to perform a simple operation of moving a picture to start the under-display camera and implement picture compositing, offering the under-display camera a faster and smarter way of picture shooting.

Optionally, in an implementation, according to the picture shooting method provided in this embodiment of this application, in a case that multiple pictures are moved to inside the prompt box, after S100, S211 to S214 are further included.

S211. Display at least one picture arrangement manner.

In S211, the picture arrangement manner specifies an arrangement mode of the multiple pictures to be moved to inside the prompt box for the under-display camera, and a manner of compositing the multiple pictures into the target picture together with the picture scene acquired by the under-display camera.

In actual application, the at least one picture arrangement manner may be an eight-square grid, a nine-square grid, a ten-square grid, a poster, a free combination, or another arrangement manner.

S212. Receive first input by a user on a target picture arrangement manner, and in response to the first input, arrange pictures inside the prompt box according to a target picture arrangement manner to obtain a spliced picture.

In S212, the first input is a selection operation on the target picture arrangement manner. When the first input on the target picture arrangement mode by the user is received, it indicates that the user needs to splice and composite, according to the target picture arrangement manner, the multiple pictures moved to inside the prompt box and the picture scene acquired by the under-display camera. In this case, the pictures inside the prompt box are arranged according to a target picture arrangement manner to obtain a spliced picture based on the multiple pictures moved to inside the prompt box, so that the spliced picture is composited with the picture scene acquired by the under-display camera.

S213. Invoke the under-display camera to acquire a preview picture.

For details about S213, refer to detailed descriptions about S202, which are not described herein again.

S214. Generate a target picture based on the preview picture and the spliced picture.

In S214, the preview picture and the spliced picture are composited into one picture according to the picture composite technology, so that the target picture is obtained and displayed on the screen.

In this implementation, when it is detected that the multiple pictures are moved to the first region, not only the under-display camera can be started for picture shooting, but also at least one picture arrangement manner is displayed, and when the first input on the target picture arrangement manner is received, the multiple pictures moved to the first region are spliced according to the target picture arrangement manner and then composited into the target picture together with the preview picture acquired by the under-display camera. In this way, the user just needs to perform a simple operation of moving a picture to start the under-display camera and implement picture compositing, offering the under-display camera a faster and smarter way of picture shooting.

Figure 3:
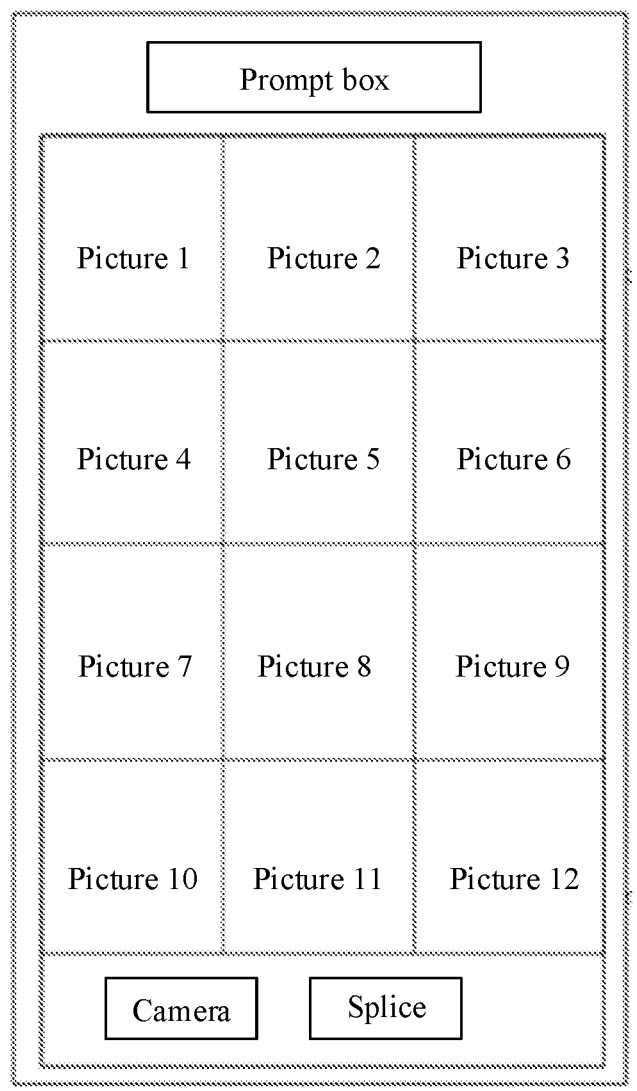
FIG. 3 is a schematic diagram of a prompt box for an under-display camera displayed on an album screen according to an embodiment of this application.
Figure 4:
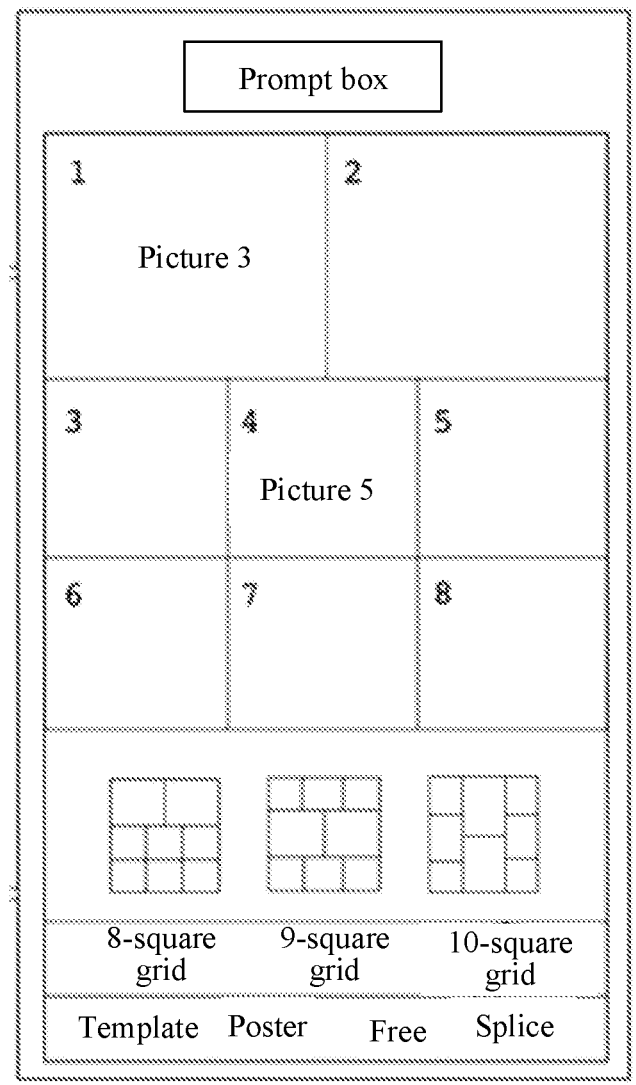
FIG. 4 is a schematic diagram of display of picture arrangement manners according to an embodiment of this application.

In actual application, referring to FIG. 3 and FIG. 4, FIG. 3 is a schematic diagram of a prompt box for an under-display camera displayed on an album screen, and FIG. 4 is a schematic diagram of display of picture arrangement manners.

As shown in FIG. 3, a prompt box is displayed on top of an album screen, that is, on a screen region corresponding to the under-display camera, pictures included in the album are displayed in the middle of the album screen, and a camera button and a splice button are displayed at the bottom of the album screen. When the user taps the camera button, the camera is directly started for picture shooting; when the user directly moves one picture to inside the prompt box, the under-display camera is started for picture shooting, with the picture moved into the prompt box being used as a picture background to generate a target picture; and when the user selects at least one picture in the album and taps the spice button, a screen shown in FIG. 4 is displayed. As shown in FIG. 4, a prompt box is displayed on a screen region corresponding to the under-display camera, and a splice button and three splicing manners of template, poster, and free are displayed at the bottom of the screen. Arrangement manners such as eight-square grid, nine-square grid, and ten-square grid are set under the template splicing manner menu, and the user may move pictures in the grid to adjust an arrangement order of the pictures, and tap the splice button to obtain a spliced picture. When the spliced picture is moved to inside the prompt box, the under-display camera is started for picture shooting, and the spliced picture is composited into a target picture together with the preview picture acquired by the under-display camera.

Figure 5:
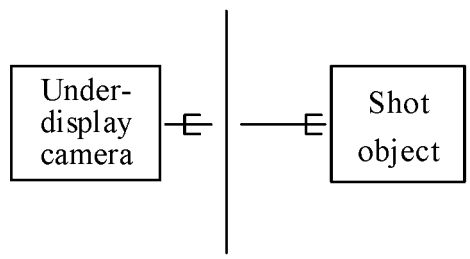
FIG. 5 is a schematic diagram of light in which an under-display camera performs picture shooting according to an embodiment of this application.

Refer to FIG. 5 which is a schematic diagram of light in which an under-display camera performs picture shooting. As shown in FIG. 5, when at least one picture is moved to a first region to start the under-display camera for picture shooting, the at least one picture moved to the first region is displayed on a screen, and a shot object and the under-display camera are located at two sides of the screen respectively. The under-display camera acquires a preview picture of the shot object, and uses the at least one picture moved to the first region as a picture background to generate a target picture together with the preview picture.

Optionally, in a specific implementation, S214 includes S2141 and S2142.

S2141. Determine the spliced picture as a picture background.

In S2141, when the user chooses to move the at least one picture to the first region, it indicates that the user wants to use the spliced picture obtained by splicing the at least one picture, as a background material to process a current picture scene acquired by the under-display camera. Thus, the picture being used as the shooting background allows a shooting effect of a composited picture to be displayed in real time.

S2142. Overlay the picture background with the preview picture to generate the target picture.

In S2142, the picture background obtained in S2141 is overlaid with the preview picture acquired by the under-display camera based on the current picture scene within its field of view angle, to perform picture compositing, so as to obtain the target picture.

In this specific implementation, when it is detected that multiple pictures are moved to the first region, the under-display camera is started for picture shooting, the multiple pictures moved to the first region are composited into a spliced picture, and the spliced picture is overlaid with the preview picture acquired by the under-display camera, to obtain the target picture through compositing. In this way, the user just needs to perform a simple operation of moving a picture to start the under-display camera and implement picture compositing, offering the under-display camera a faster and smarter way of picture shooting.

Optionally, in a specific implementation, S214 includes S2143.

S2143. Splice the preview picture into a preset region in the spliced picture to generate the target picture.

In this embodiment, a generation position, shape, special effect, and the like of a preset region are specified for each picture arrangement manner. When the multiple pictures moved to the first region are composited into a spliced picture, a preset region for splicing and filling with the preview picture can be generated in the spliced picture at the same time, so that the preview picture acquired by the under-display camera can be spliced into the preset region to form a complete target picture.

In the specific implementation, when it is detected that the multiple pictures are moved to the first region of the screen, the under-display camera is started for picture shooting, and the multiple pictures moved to the first region are composited into the spliced picture with the preset region, and then the preview picture acquired by the under-display camera is spliced into the preset region in the spliced picture to obtain the target picture through compositing. In this way, the user just needs to perform a simple operation of moving a picture to start the under-display camera and implement picture compositing, offering the under-display camera a faster and smarter way of picture shooting.

Optionally, in an implementation, in a case that the prompt box for the under-display camera is displayed in the first region of the preset screen, the picture shooting method provided in this embodiment of this application further includes S301 and S302 after S100, and further includes S303 after the step of generating the target picture.

S301. Determine a first application to which the preset screen belongs.

In S301, when it is detected that the at least one picture is moved to the first region in the preset screen and the under-display camera is triggered to start picture shooting, a currently running application is determined through the preset screen on which the under-display camera is triggered to start picture shooting, that is, the application to which the current preset screen belongs is determined, so as to predict a subsequent processing on the target picture.

S302. Determine a first picture interaction screen based on the preset screen and the first application.

In S302, an application operation that the user is to perform on the target picture obtained in S203 or S214 is predicted, based on the current screen for triggering the under-display camera to start picture shooting and the application to which the current screen belongs, so as to determine a picture interaction screen that is based on the application and where the application operation the user is to perform is executed, namely, the first picture interaction screen. For example, if it is determined that the screen is a Moments screen when the under-display camera is started, that is, the user is having the Moments screen active, a Moments posting screen is the first picture interaction screen; and if it is determined that the screen is a chat screen when the under-display camera is started, the chat screen is the first picture interaction screen.

S303. Load the target picture into the first picture interaction screen.

In S303, the target picture generated in S203 or S214 is directly loaded into the first picture interaction screen determined in S302, so that the user can determine whether to perform a subsequent operation.

For example, in a case that the first picture interaction screen is a Moments posting screen, the target picture is loaded into the Moments posting screen and a to-be-posted Moments picture screen is generated, and the user can directly tap post after determining that there is no problem; and in a case that the first picture interaction screen is a chat screen, the target picture is loaded into the chat screen and sent to a person to chat with.

In this implementation, the at least one picture is moved to the first region, so that the under-display camera is triggered to start picture shooting, so as to obtain the target picture; the first picture interaction screen is determined based on the preset screen on which the under-display camera is started for picture shooting and the application to which the preset screen belongs; and the generated target picture is loaded into the first picture interaction screen. In this way, the user just needs to perform a simple operation of moving a picture to start the under-display camera and implement picture compositing, and the target picture is automatically loaded into the picture interaction screen.

Optionally, in an implementation, after S100, the picture shooting method provided in this embodiment of this application further includes S311 to S313; and further includes S314 after the step of generating the target picture.

S311. Acquire current content displayed on a screen by using the under-display camera.

In S311, the under-display camera needs to shoot a picture through the screen, so that the content displayed on the current screen can be captured by using the under-display camera.

S321. Determine a first application to which the displayed content belongs.

In S312, a specific application currently running on the electronic device is determined based on the current content displayed on the screen captured in S311, that is, the first application, so as to predict subsequent processing on the target picture.

S313. Determine a first picture interaction screen based on the displayed content and the first application.

In S313, based on the content displayed on the current screen when the under-display camera is triggered to start picture shooting and the application to which the current screen belongs, an application operation that the user is to perform on the target picture obtained in S203 or S214 is predicted, so as to determine the picture interaction screen that is based on the application and where the application operation the user is to perform is executed, namely, the first picture interaction screen. For example, if it is determined, based on the displayed content, that the screen is a Moments screen when the under-display camera is started, that is, the user is having the Moments screen active, a Moments posting screen is the first picture interaction screen; and if it is determined, based on the displayed content, that the screen is a chat screen when the under-display camera is started, the chat screen is the first picture interaction screen.

S314. Load the target picture into the first picture interaction screen.

In S314, the target picture generated in S203 or S214 is directly loaded into the first picture interaction screen determined in S313, so that the user can determine whether to perform a subsequent operation.

Figure 6:
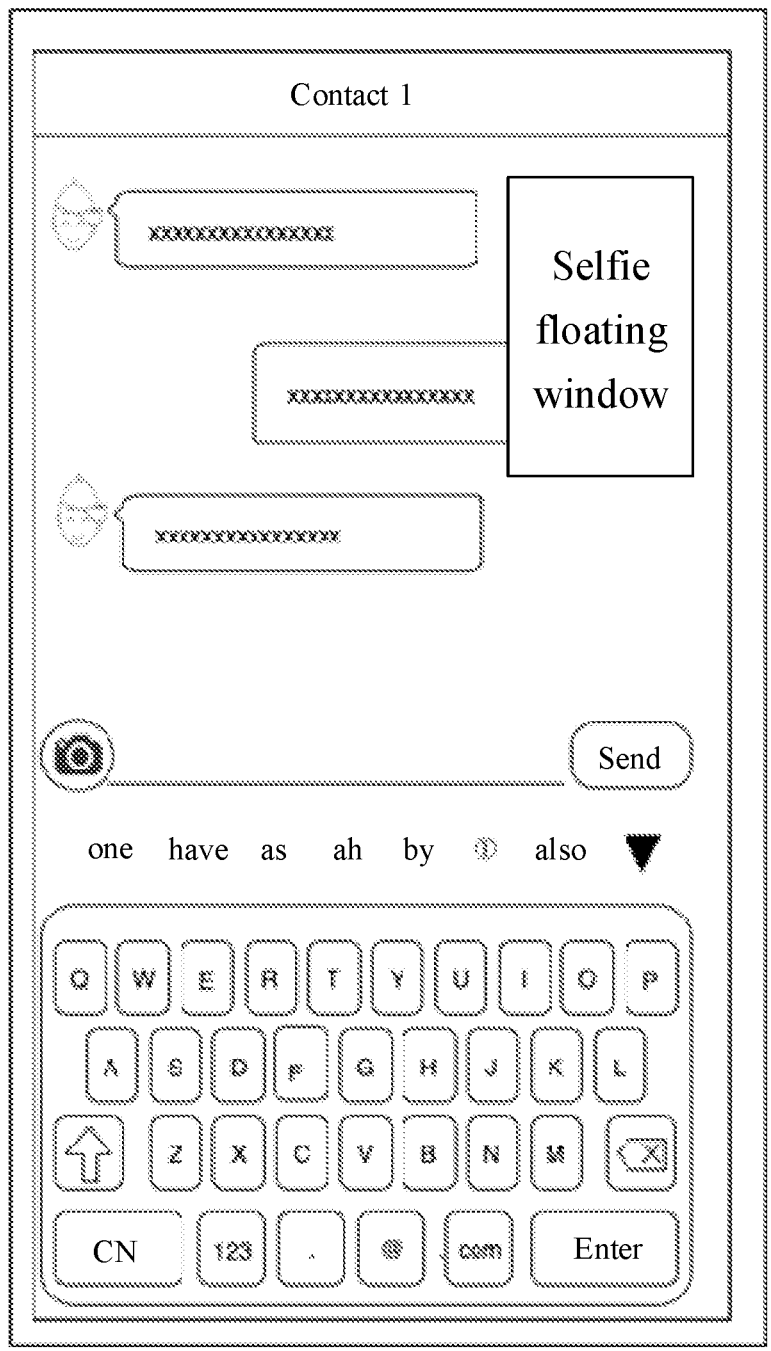
FIG. 6 is a diagram of a user operation screen captured by an under-display camera according to an embodiment of this application.

For example, if the under-display camera captures that the electronic device is currently displaying a chat screen, a picture shot by the under-display camera is directly sent to a person to chat with. For details, refer to FIG. 6 which is a diagram of a user operation screen captured by the under-display camera. As shown in FIG. 6, in a case that the under-display camera captures that the electronic device is currently displaying a chat screen, a shot picture is displayed in a form of a selfie floating window on the chat screen, and when third input on the selfie floating window is received, the picture in the selfie floating window is sent to the person to chat with.

It should be noted that the picture shooting method provided in the embodiments of this application may be performed by a picture shooting apparatus or a control module for performing the picture shooting method in the picture shooting apparatus. The picture shooting apparatus performing the picture shooting method is used as an example in the embodiments of this application to describe the picture shooting method provided in the embodiments of this application.

Figure 7:
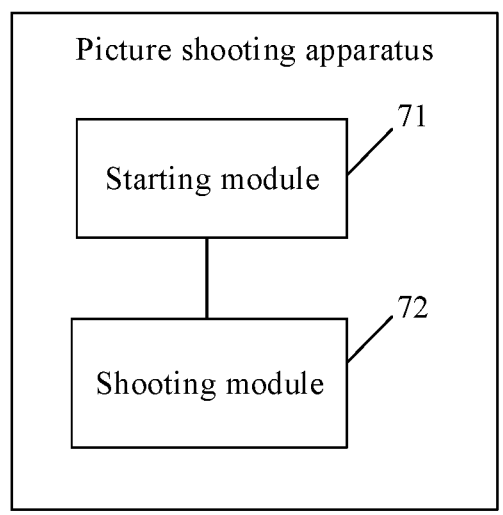
FIG. 7 is a schematic structural diagram of a picture shooting apparatus according to an embodiment of this application.

Refer to FIG. 7 which is a schematic structural diagram of a picture shooting apparatus according to an embodiment of this application. As shown in FIG. 7, the apparatus includes:
  a starting module 71, configured to start an under-display camera when a first picture is moved to a first region;
    where the first region is a screen region corresponding to a position of the under-display camera.
  Optionally, the apparatus further includes a shooting module 72, where the shooting module 72 includes:
    a determining unit, configured to: in a case that one picture is moved to the first region, after the starting an under-display camera when a first picture is moved to a first region, determine the picture moved to the first region as a picture background.
  Optionally, in the picture shooting apparatus, the shooting module 72 further includes:
    a first invoking unit, configured to: after the determining the picture moved to the first region as a picture background, invoke the under-display camera to acquire a preview picture; and
    a first generating unit, configured to generate a target picture based on the preview picture and the picture background.
  Optionally, in the picture shooting apparatus, the shooting module 72 includes:
    a display unit, configured to: in a case that multiple pictures are moved to the first region, after the starting an under-display camera when a first picture is moved to a first region, display at least one picture arrangement manner;
    a picture splicing unit, configured to: receive a first input by a user on a target picture arrangement manner, and in response to the first input, arrange, according to the target picture arrangement manner, the pictures moved to the first region, to obtain a spliced picture;
    a second invoking unit, configured to invoke the under-display camera to acquire a preview picture; and
    a second generating unit, configured to generate a target picture based on the preview picture and the spliced picture.
  Optionally, in the picture shooting apparatus, the second generating unit includes:
    a determining sub-unit, configured to determine the spliced picture as a picture background; and
    a first generating sub-unit, configured to overlay the picture background with the preview picture to generate the target picture.
  Optionally, in the picture shooting apparatus, the second generating unit includes:
    a second generating sub-unit, configured to splice the preview picture into a preset region in the spliced picture to generate the target picture.
  Optionally, the apparatus further includes:
    a display module, configured to: before the under-display camera is started when the first picture is moved to the first region, in a case that a preset control is on, when a preset screen is displayed, display a prompt box for the under-display camera in the first region in the preset screen.
  Optionally, the apparatus further includes:
    a first determining module, configured to: after the under-display camera is started when the first picture is moved to the first region, determine an application to which the preset screen belongs;
    a second determining module, configured to determine, based on the preset screen and the application, a target picture interaction screen that is based on the application; and
    a first loading module, configured to load the target picture into the target picture interaction screen after the target picture is generated.
  Optionally, the apparatus further includes:
    a capturing module, configured to: after the starting the under-display camera when a first picture is moved to a first region, capture current content displayed on a screen using the under-display camera;
    a third determining module, configured to determine a second application to which the displayed content belongs;
    a fourth determining module, configured to determine a second picture interaction screen according to the displayed content and the second application; and
    a second loading module, configured to load the target picture into the second picture interaction screen after the target picture is generated.

The picture shooting apparatus in this embodiment of this application may be an apparatus or may be a component, an integrated circuit, or a chip in a terminal. Such apparatus may be a mobile electronic device or a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, a personal digital assistant (PDA), or the like, and the non-mobile electronic device may be a server, a network attached storage (NAS), a personal computer (PC), a television (TV), a teller machine, a self-service machine, or the like. This is not specifically limited in this embodiment of this application.

The picture shooting apparatus in this embodiment of this application may be an apparatus with an operating system. The operating system may be an Android operating system, may be an iOS operating system, or may be another possible operating system. This is not specifically limited in this embodiment of this application.

The picture shooting apparatus provided in this embodiment of this application is capable of implementing various processes that are implemented by the picture shooting apparatus in the method embodiments of FIG. 1 to FIG. 6. To avoid repetition, details are not described herein again.

To sum up, according to the picture shooting apparatus provided in this embodiment of this application, when the first picture is moved to the first region, the starting module 71 starts the under-display camera. In addition, according to this embodiment of this application, when it is detected that the at least one picture is moved to inside the prompt box, the shooting module 72 starts the under-display camera for picture shooting and generates the target picture. In this way, the under-display camera can be started after a user performs a simple operation of moving a picture, which is flexible and convenient.

Optionally, an embodiment of this application further provides an electronic device, including a processor 810, a memory 809, and a program or instructions stored in the memory 809 and capable of running on the processor 810. When the program or instructions are executed by the processor 810, the processes of the foregoing embodiments of the picture shooting method are implemented, with the same technical effects achieved. To avoid repetition, details are not described herein again.

It should be noted that the electronic device in the embodiments of this application includes the foregoing mobile electronic device and non-mobile electronic device.

Figure 8:
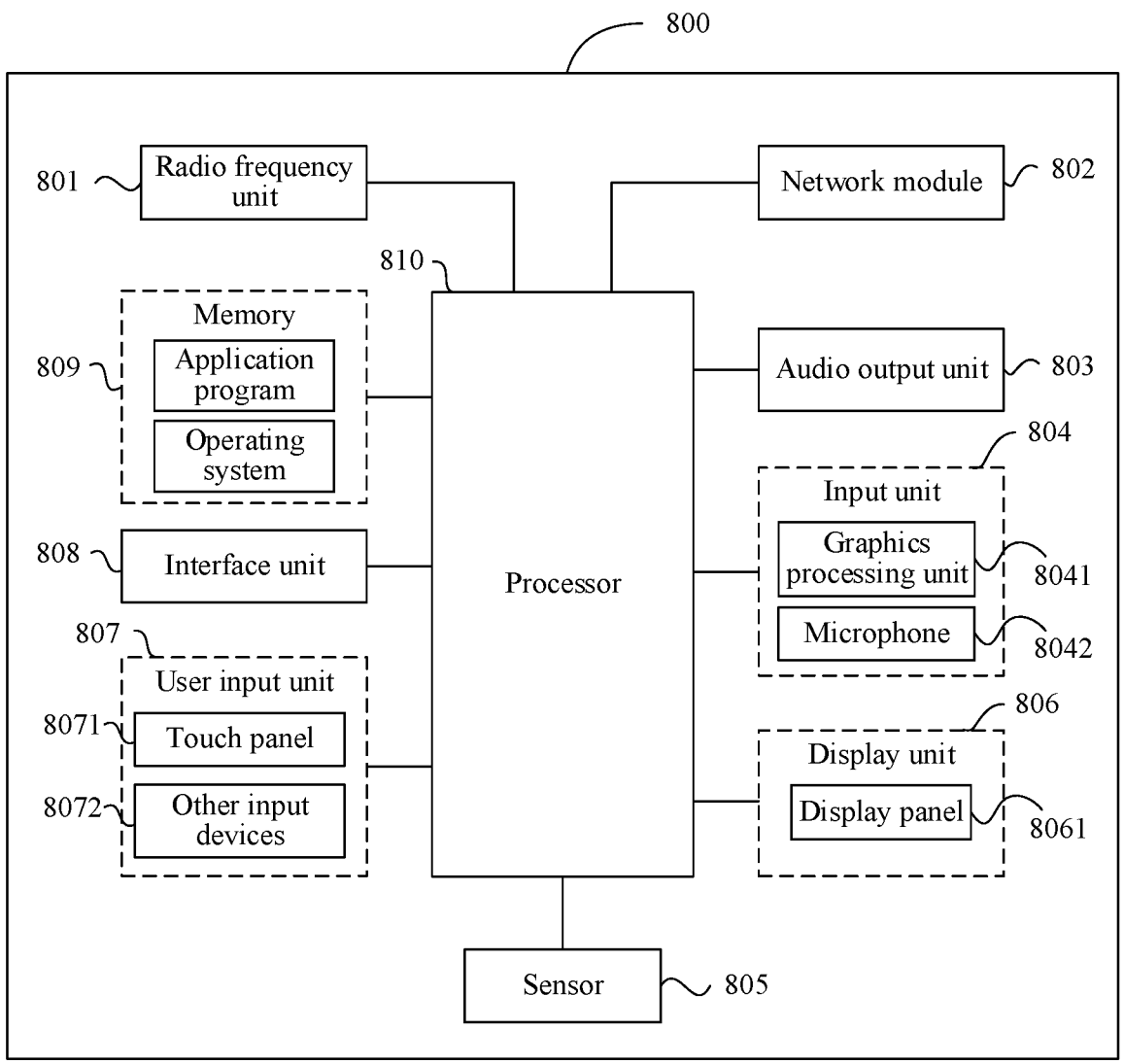
FIG. 8 is a schematic structural diagram of an electronic device according to an embodiment of this application.

FIG. 8 is a schematic diagram of a hardware structure of an electronic device according to an embodiment of this application.

The electronic device 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

A person skilled in the art can understand that the electronic device 800 may further include a power supply (such as a battery) for supplying power to the components. The power supply may be logically connected to the processor 810 through a power management system. In this way, functions such as charge management, discharge management, and power consumption management are implemented by using the power management system. The structure of the electronic device shown in FIG. 8 does not constitute a limitation on the electronic device. The electronic device may include more or fewer components than shown in the figure, or a combination of some components, or components disposed differently. Details are not described herein.

The processor 810 is configured to start an under-display camera when a first picture is moved to a first region, where the first region is a screen region corresponding to a position of the under-display camera.

According to the electronic device provided in this embodiment of this application, when it is detected that at least one picture is moved to inside a prompt box, the processor 810 starts the under-display camera for picture shooting, so as to generate a target picture. In this way, the under-display camera can be started after a user performs a simple operation of moving a picture, which is flexible and convenient.

Optionally, the display unit 806 is configured to: before the under-display camera is started when the first picture is moved to the first region, in a case that a preset control is on, when a preset screen is displayed, display a prompt box for the under-display camera in the first region in the preset screen.

Optionally, the processor 810 is further configured to: determine an application to which the preset screen belongs; determine, based on the preset screen and the application, a first picture interaction screen that is based on the application; and load the target picture into the first picture interaction screen.

Optionally, in a case that one picture is moved to inside the prompt box, the processor 810 is specifically configured to: determine the picture moved to inside the prompt box as a picture background; invoke the under-display camera to acquire a preview picture; and generate the target picture based on the preview picture and the picture background.

Optionally, in a case that multiple pictures are moved to inside the prompt box, the display unit 806 is specifically configured to display at least one picture arrangement manner; and the processor 810 is specifically configured to: receive first input by a user on a target picture arrangement manner; in response to the first input, arrange, according to the target picture arrangement manner, the pictures moved to the first region, to obtain a spliced picture; invoke the under-display camera to acquire a preview picture; and generate the target picture based on the preview picture and the spliced picture.

Optionally, the processor 810 is specifically configured to: determine the spliced picture as a picture background; and overlay the picture background with the preview picture to generate the target picture.

Optionally, the processor 810 is specifically configured to splice the preview picture into a preset region in the spliced picture to generate the target picture.

Optionally, the processor 810 is specifically configured to: after the under-display camera is started when the first picture is moved to the first region, acquire current content displayed on a screen by using the under-display camera; determine a second application to which the displayed content belongs; determine a second picture interaction screen based on the displayed content and the second application; and after generating the target picture, load the target picture into the second picture interaction screen.

An embodiment of this application further provides a readable storage medium, where the readable storage medium stores a program or instructions, and when the program or instructions are executed by a processor, the processes of the foregoing embodiments of the picture shooting method are implemented, with the same technical effects achieved. To avoid repetition, details are not described herein again.

The processor is the processor in the electronic device in the foregoing embodiments. The readable storage medium includes a computer-readable storage medium, such as a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions to implement the processes of the foregoing embodiments of the picture shooting method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, a person skilled in the art may clearly understand that the method in the foregoing embodiments may be implemented by software with a necessary general hardware platform. Certainly, the method in the foregoing embodiments may alternatively be implemented by hardware. However, in many cases, the former is an example implementation. Based on such understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, a person of ordinary skill in the art may develop many other manners without departing from the essence of this application and the protection scope of the claims, and all such manners shall fall within the protection scope of this application.

What is claimed is:

1. A picture shooting method, comprising:
    starting an under-display camera when a first picture is moved to a first region;
    wherein the first region is a screen region corresponding to a position of the under-display camera;
    in a case that one picture is moved to the first region, after starting the under-display camera, determining the one picture moved to the first region as a picture background;
    after determining the one picture moved to the first region as the picture background, invoking the under-display camera to acquire a preview picture; and
    generating a target picture based on the preview picture and the picture background.

2. The picture shooting method according to claim 1, in a case that multiple pictures are moved to the first region, after the step of starting an under-display camera when a first picture is moved to a first region, further comprising:
    displaying at least one picture arrangement manner;
    receiving first input by a user on a target picture arrangement manner;
    in response to the first input, arranging the pictures inside a prompt box according to a target picture arrangement manner to obtain a spliced picture;
    invoking the under-display camera to acquire a preview picture; and
    generating a target picture based on the preview picture and the spliced picture.

3. The picture shooting method according to claim 2, after the step of starting an under-display camera when a first picture is moved to a first region, further comprising:
    capturing current content displayed on a screen using the under-display camera;
    determining a first application to which the displayed content belongs; and
    determining a first picture interaction screen according to the displayed content and the first application; and
    after the step of generating a target picture, the method further comprises:
    loading the target picture into the first picture interaction screen.

4. The picture shooting method according to claim 1, after the step of starting an under-display camera when a first picture is moved to a first region, further comprising:
    capturing current content displayed on a screen using the under-display camera;
    determining a first application to which the displayed content belongs; and
    determining a first picture interaction screen according to the displayed content and the first application; and
    after the step of generating a target picture, the method further comprises:
    loading the target picture into the first picture interaction screen.

5. An electronic device, comprising a processor, a memory, and instructions stored in the memory and capable of running on the processor, wherein when the instructions are executed by the processor, steps of a picture shooting method are implemented, the steps comprises:
    starting an under-display camera when a first picture is moved to a first region;
    wherein the first region is a screen region corresponding to a position of the under-display camera;
    in a case that one picture is moved to the first region, after starting the under-display camera, determining the one picture moved to the first region as a picture background;
    after determining the one picture moved to the first region as the picture background, invoking the under-display camera to acquire a preview picture; and
    generating a target picture based on the preview picture and the picture background.

6. The electronic device according to claim 5, in a case that multiple pictures are moved to the first region, after the step of starting an under-display camera when a first picture is moved to a first region, the steps further comprising:
    displaying at least one picture arrangement manner;
    receiving first input by a user on a target picture arrangement manner;

in response to the first input, arranging the pictures inside a prompt box according to a target picture arrangement manner to obtain a spliced picture;

invoking the under-display camera to acquire a preview picture; and generating a target picture based on the preview picture and the spliced picture.

7. The electronic device according to claim 6, after the step of starting an under-display camera when a first picture is moved to a first region, the steps further comprising:

capturing current content displayed on a screen using the under-display camera;

determining a first application to which the displayed content belongs; and determining a first picture interaction screen according to the displayed content and the first application; and after the step of generating a target picture, the method further comprises:

loading the target picture into the first picture interaction screen.

8. The electronic device according to claim 5, after the step of starting an under-display camera when a first picture is moved to a first region, the steps further comprising:

capturing current content displayed on a screen using the under-display camera;

determining a first application to which the displayed content belongs; and determining a first picture interaction screen according to the displayed content and the first application; and after the step of generating a target picture, the method further comprises:

loading the target picture into the first picture interaction screen.

9. A non-transitory readable storage medium, wherein the readable storage medium stores instructions, and when the instructions are executed by a processor, steps of a picture shooting method are implemented, the steps comprises:

starting an under-display camera when a first picture is moved to a first region;

wherein the first region is a screen region corresponding to a position of the under-display camera;

in a case that one picture is moved to the first region, after starting the under-display camera, determining the one picture moved to the first region as a picture background;

after determining the one picture moved to the first region as the picture background, invoking the under-display camera to acquire a preview picture; and generating a target picture based on the preview picture and the picture background.

10. The non-transitory readable storage medium according to claim 9, in a case that multiple pictures are moved to the first region, after the step of starting an under-display camera when a first picture is moved to a first region, the steps further comprising:

displaying at least one picture arrangement manner;

receiving first input by a user on a target picture arrangement manner;

in response to the first input, arranging the pictures inside a prompt box according to a target picture arrangement manner to obtain a spliced picture;

invoking the under-display camera to acquire a preview picture; and generating a target picture based on the preview picture and the spliced picture.

11. The non-transitory readable storage medium according to claim 10, after the step of starting an under-display camera when a first picture is moved to a first region, the steps further comprising:

capturing current content displayed on a screen using the under-display camera;

determining a first application to which the displayed content belongs; and determining a first picture interaction screen according to the displayed content and the first application; and after the step of generating a target picture, the method further comprises:

loading the target picture into the first picture interaction screen.

12. The non-transitory readable storage medium according to claim 9, after the step of starting an under-display camera when a first picture is moved to a first region, the steps further comprising:

capturing current content displayed on a screen using the under-display camera;

determining a first application to which the displayed content belongs; and determining a first picture interaction screen according to the displayed content and the first application; and after the step of generating a target picture, the method further comprises:

loading the target picture into the first picture interaction screen.

* * * * *